(12) United States Patent
Amemiya et al.

(10) Patent No.: US 10,296,189 B2
(45) Date of Patent: May 21, 2019

(54) INFORMATION PROCESSING DEVICE AND PROGRAM

(71) Applicant: Sony Corporation, Tokyo (JP)

(72) Inventors: Ryoji Amemiya, Kanagawa (JP);
Nobutaka Yagi, Kanagawa (JP);
Osamu Ishioka, Chiba (JP); Kenji Waku, Kanagawa (JP); Yohei Kuroda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/822,522

(22) Filed: Aug. 10, 2015

(65) Prior Publication Data

US 2015/0346979 A1    Dec. 3, 2015

Related U.S. Application Data

(63) Continuation of application No. 12/966,572, filed on Dec. 13, 2010, now Pat. No. 9,128,665.

(30) Foreign Application Priority Data

Jan. 8, 2010   (JP) ................................. 2010-003086

(51) Int. Cl.
| | |
|---|---|
| *G06F 3/0484* | (2013.01) |
| *G06F 3/0481* | (2013.01) |
| *G06F 3/0488* | (2013.01) |
| *G06F 1/16* | (2006.01) |

(52) U.S. Cl.
CPC ........ *G06F 3/04845* (2013.01); *G06F 1/1626* (2013.01); *G06F 3/0488* (2013.01); *G06F 3/04817* (2013.01)

(58) Field of Classification Search
None
See application file for complete search history.

(56) References Cited

U.S. PATENT DOCUMENTS

| | | | |
|---|---|---|---|
| 6,028,600 A | | 2/2000 | Rosin et al. |
| 6,597,384 B1 | | 7/2003 | Harrison |
| 9,128,665 B2 | * | 9/2015 | Amemiya ............. G06F 1/1626 |
| 2002/0072418 A1 | | 6/2002 | Masuyama et al. |

(Continued)

FOREIGN PATENT DOCUMENTS

| | | |
|---|---|---|
| CN | 101047926 A | 10/2007 |
| CN | 101183292 A | 5/2008 |

(Continued)

OTHER PUBLICATIONS

Office Action dated Jun. 25, 2013 in Japanese Application No. 2010-003086.

*Primary Examiner* — Patrick N Edouard
*Assistant Examiner* — Peijie Shen
(74) *Attorney, Agent, or Firm* — XSENSUS LLP

(57) ABSTRACT

There is provided an information processing device comprising a housing, a display screen, a touch panel arranged on the display screen, an icon, which is displayed on the display screen and manipulated through the touch panel, a state detection unit for detecting a state change of the housing, a state determination unit for determining the state change of the housing detected by the state detection unit, and a display control unit for displaying the icon in a desired position on the display screen in response to a determination result of the state determination unit.

14 Claims, 20 Drawing Sheets

(56) References Cited

U.S. PATENT DOCUMENTS

| | | |
|---|---|---|
| 2002/0167550 A1 | 11/2002 | Eggen et al. |
| 2003/0085870 A1 | 5/2003 | Hinckley |
| 2004/0263428 A1 | 12/2004 | Sudo |
| 2005/0012723 A1* | 1/2005 | Pallakoff ............... G06F 1/1616 345/173 |
| 2005/0140646 A1* | 6/2005 | Nozawa ................ G06F 1/1626 345/156 |
| 2005/0197188 A1 | 9/2005 | Iizuka et al. |
| 2007/0232362 A1 | 10/2007 | Kim et al. |
| 2008/0119237 A1 | 5/2008 | Kim |
| 2008/0165153 A1* | 7/2008 | Platzer ................. G06F 1/1626 345/173 |
| 2009/0160792 A1* | 6/2009 | Morohoshi ........... G06F 1/1626 345/173 |
| 2009/0231293 A1* | 9/2009 | Nakayama ........ G01C 21/3611 345/173 |
| 2009/0289914 A1* | 11/2009 | Cho ....................... G06F 3/044 345/173 |
| 2009/0289924 A1* | 11/2009 | Takata .................. G06F 1/1626 345/184 |
| 2010/0085317 A1* | 4/2010 | Park ...................... G06F 1/1626 345/173 |
| 2011/0163944 A1* | 7/2011 | Bilbrey ................. G01D 21/02 345/156 |

FOREIGN PATENT DOCUMENTS

| | | |
|---|---|---|
| JP | 9-305315 | 11/1997 |
| JP | 2001-170358 | 6/2001 |
| JP | 2003-316511 | 11/2003 |
| JP | 2005-174006 | 6/2005 |
| JP | 2005-245619 | 9/2005 |
| JP | 2008-27183 | 2/2008 |
| JP | 2009-163278 | 7/2009 |
| JP | 2009-169820 | 7/2009 |
| JP | 2009-282857 | 12/2009 |

* cited by examiner

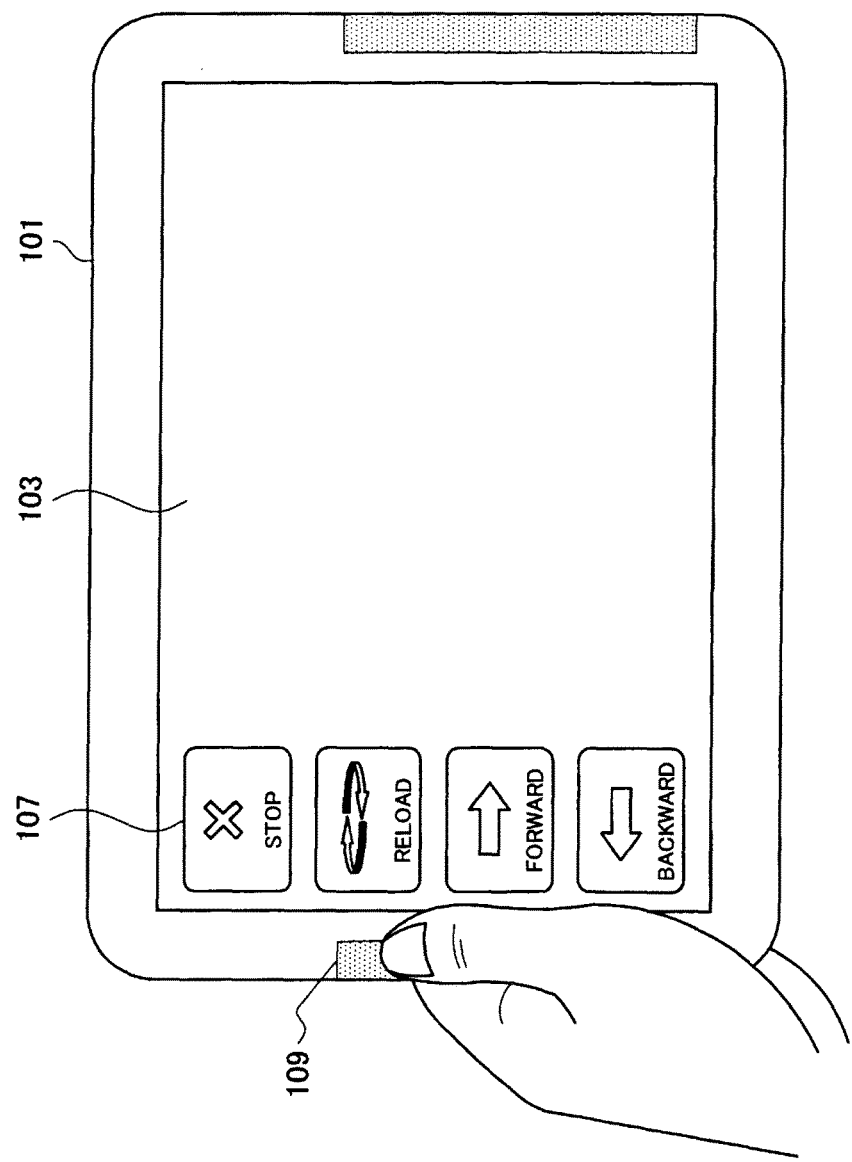

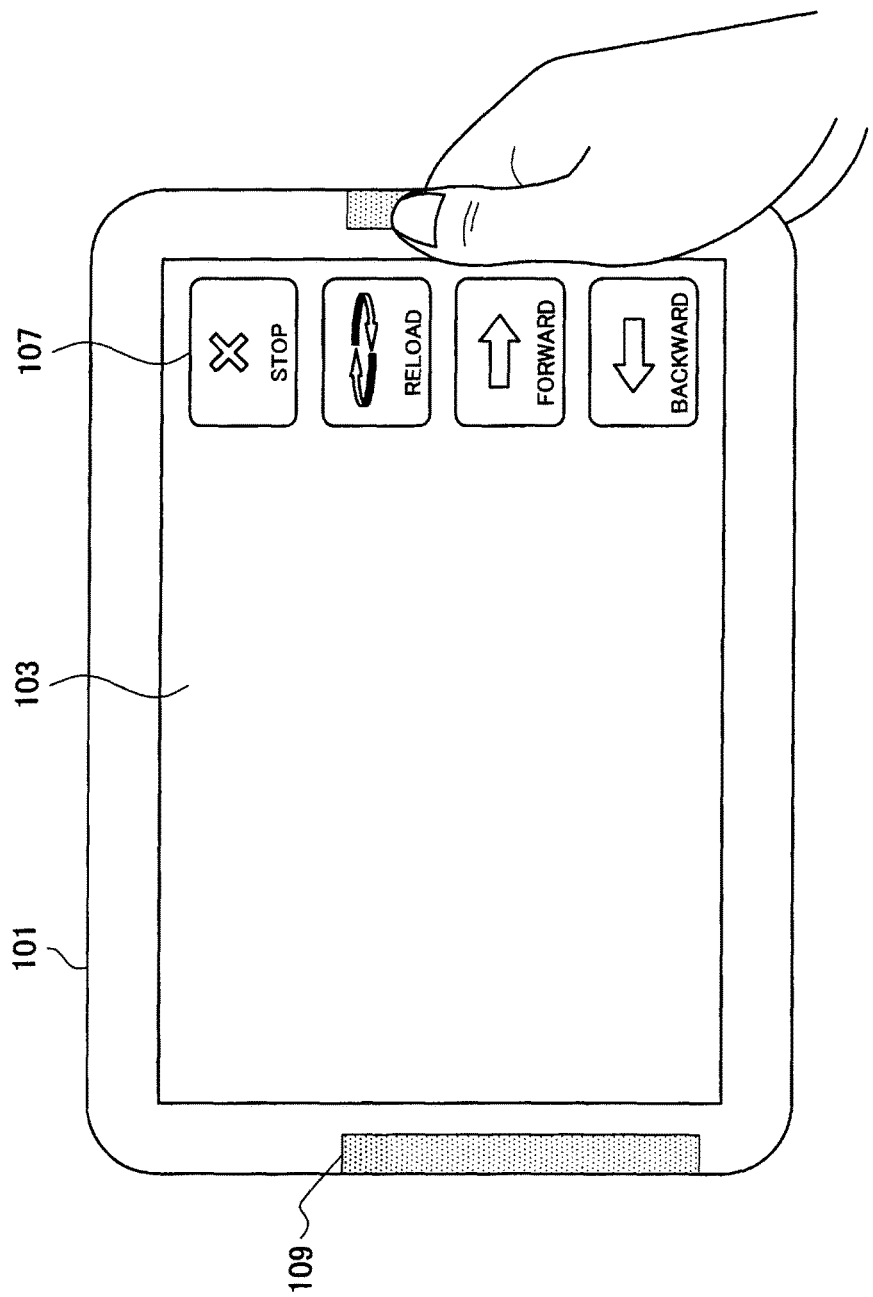

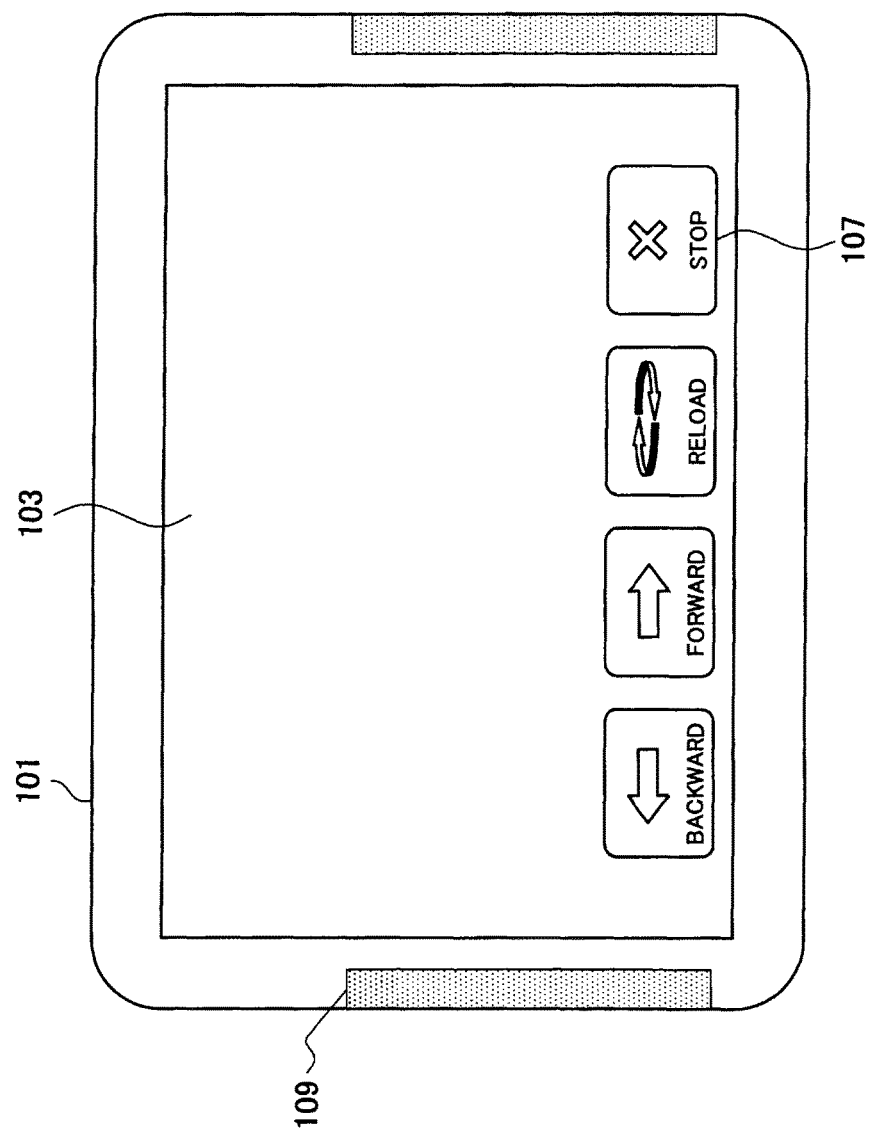

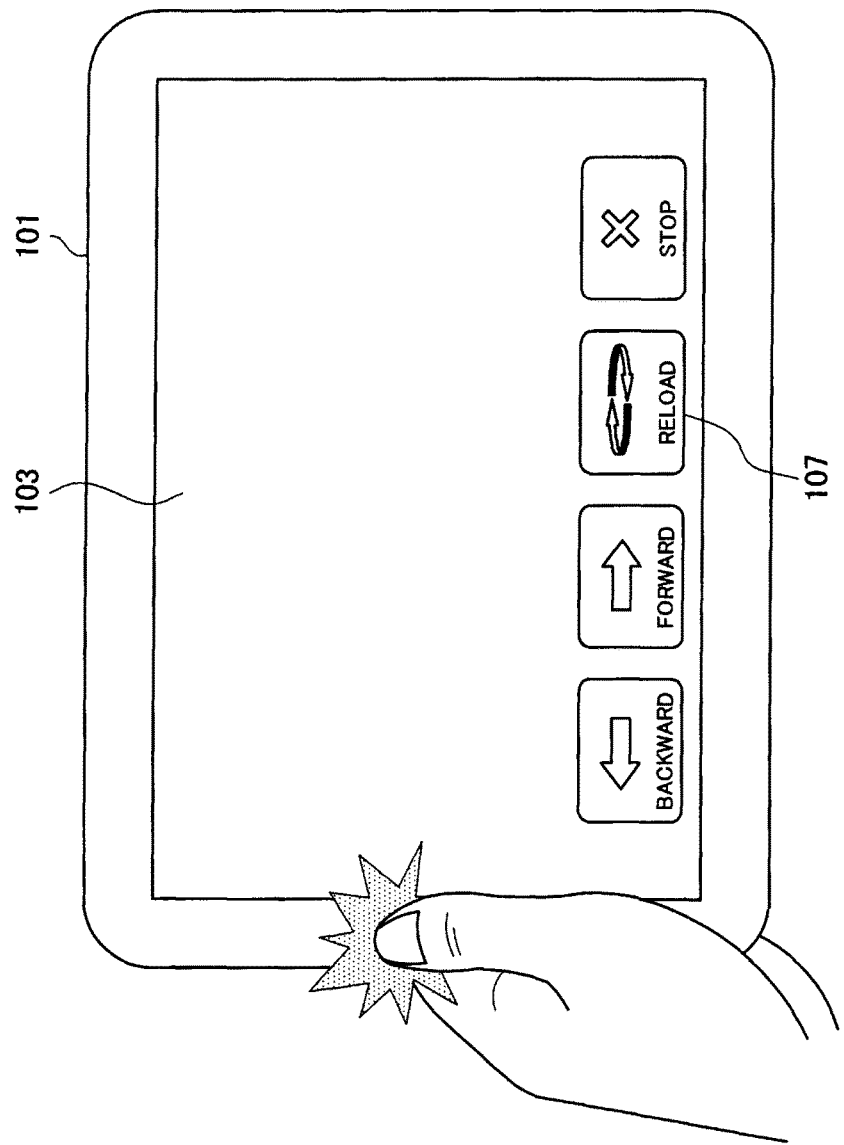

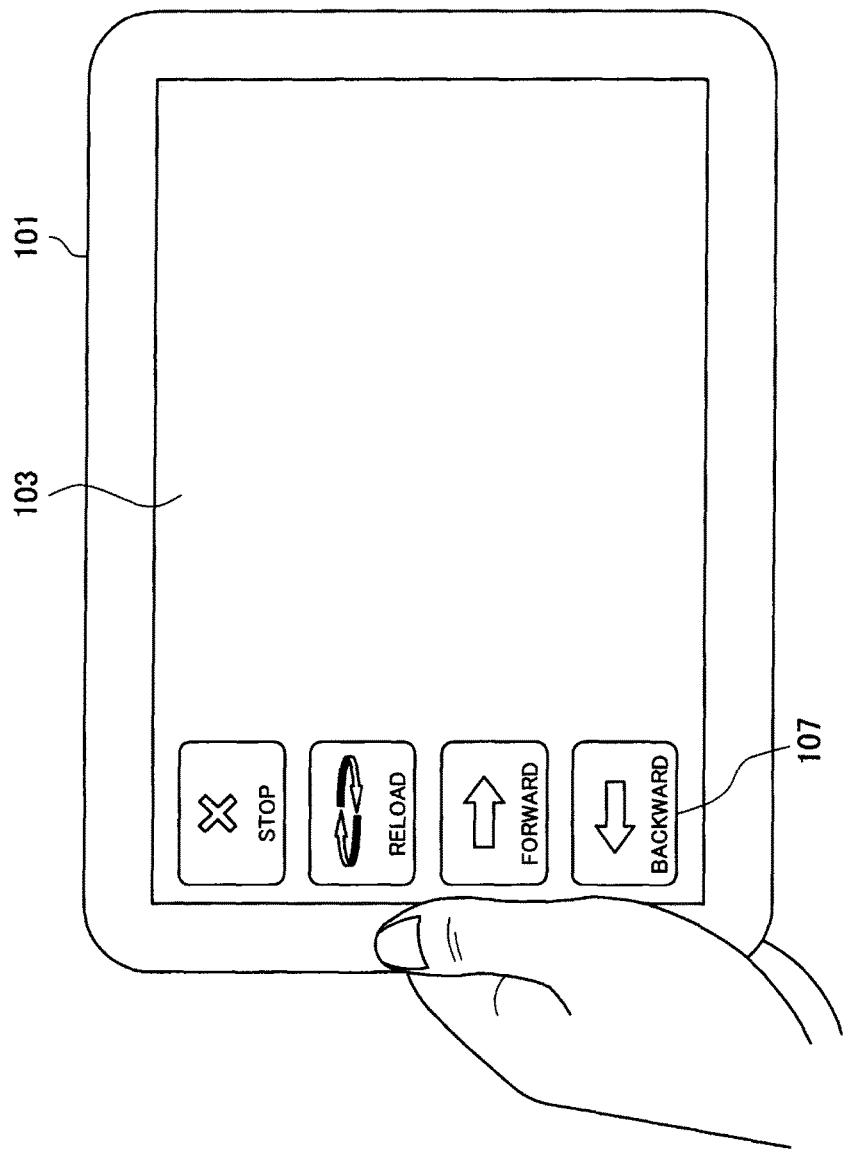

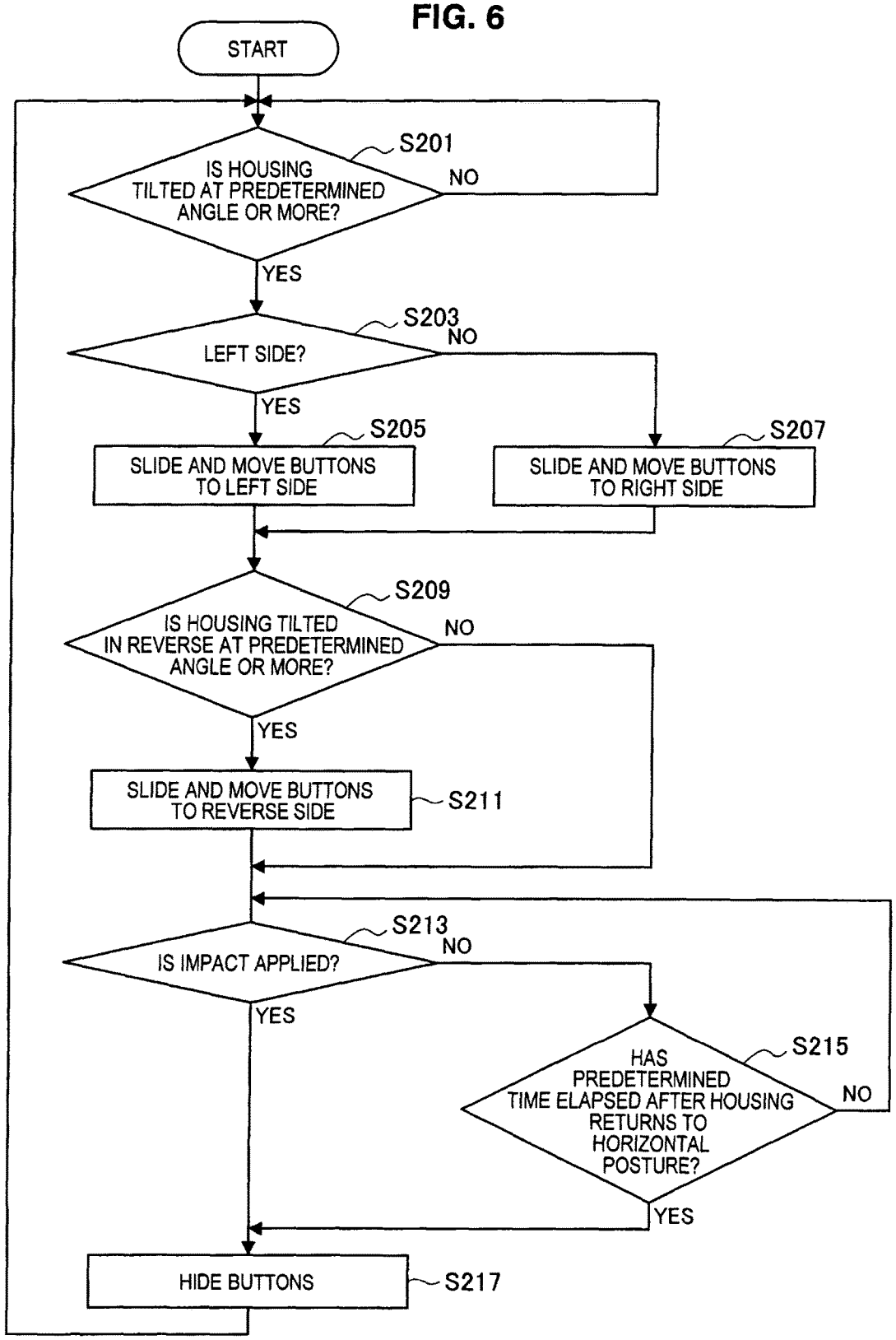

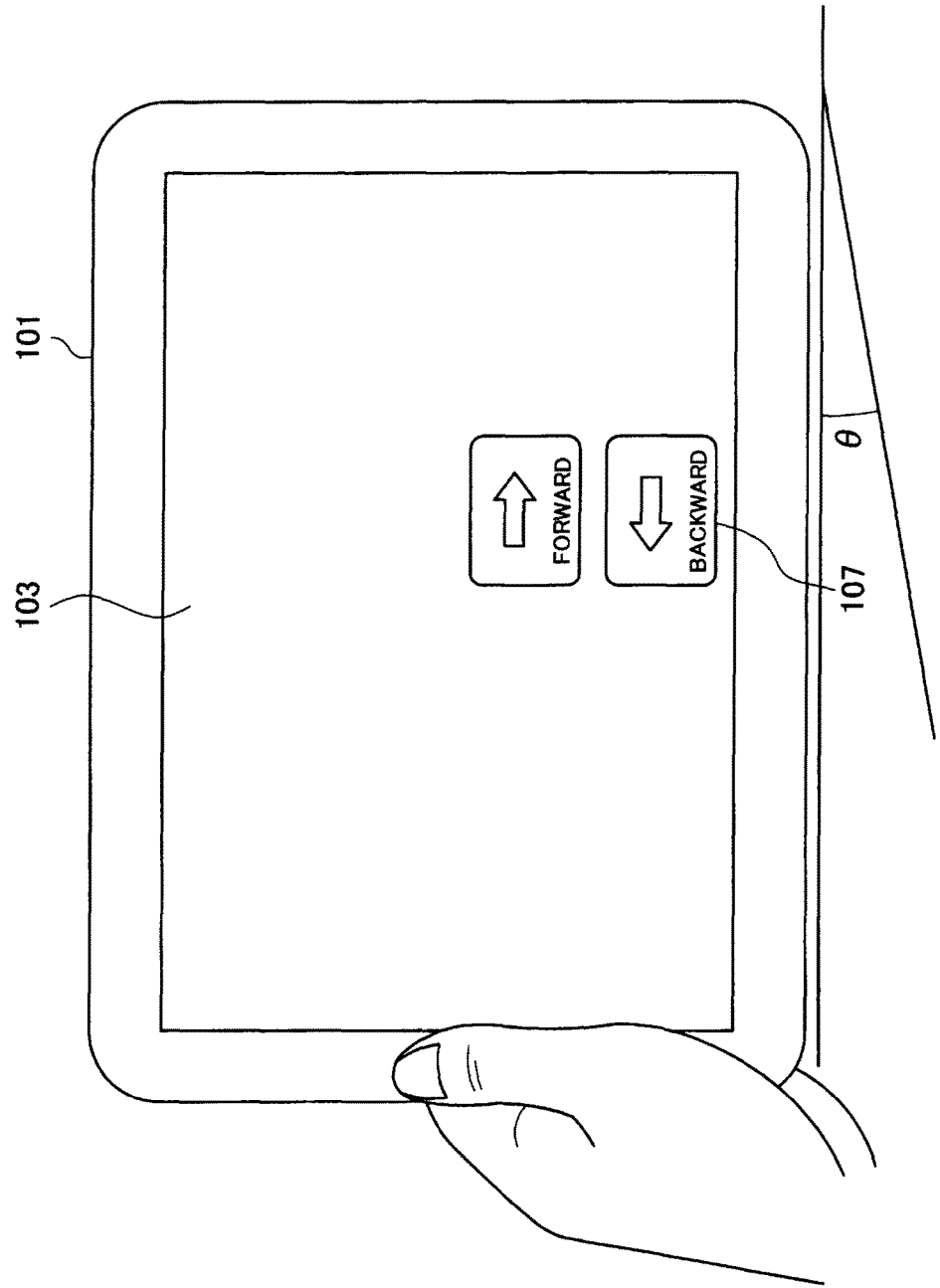

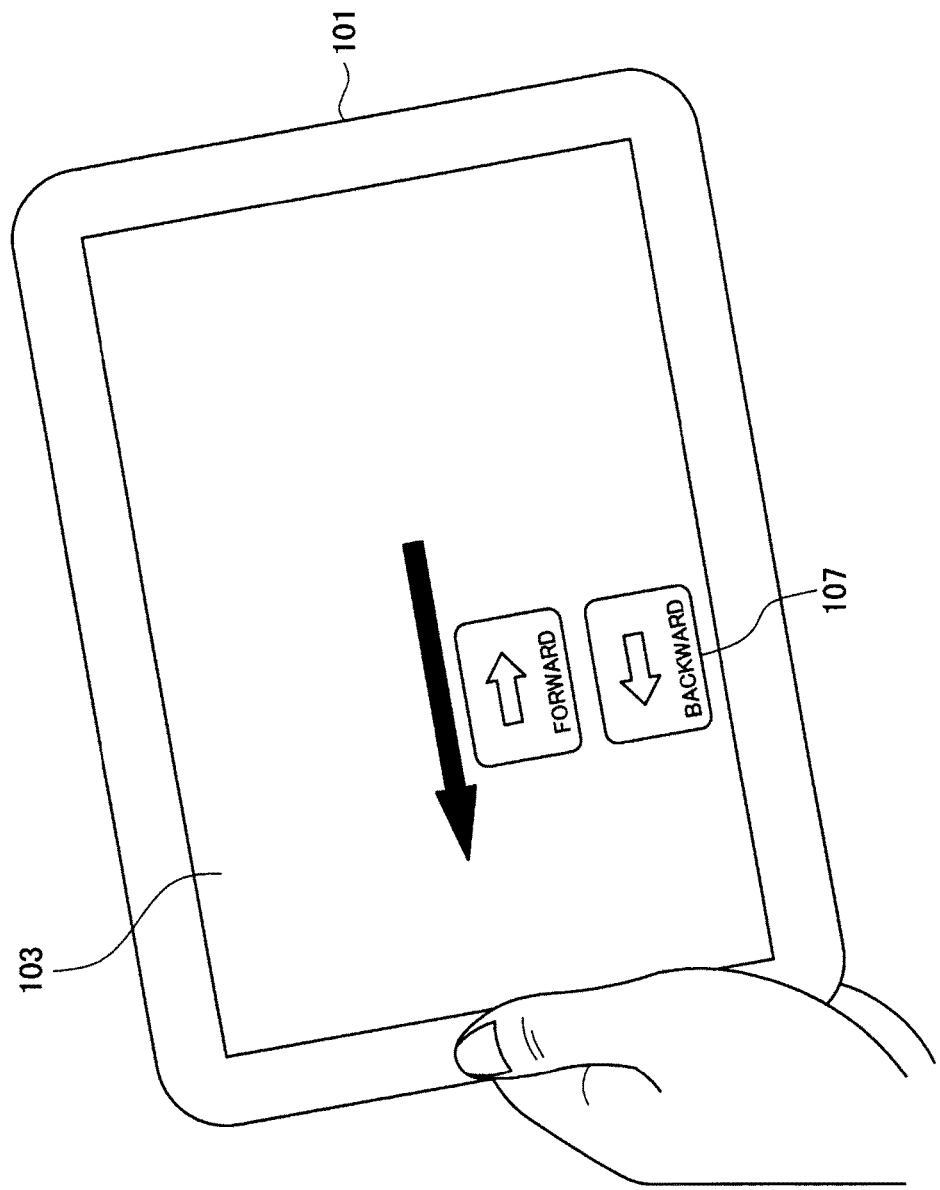

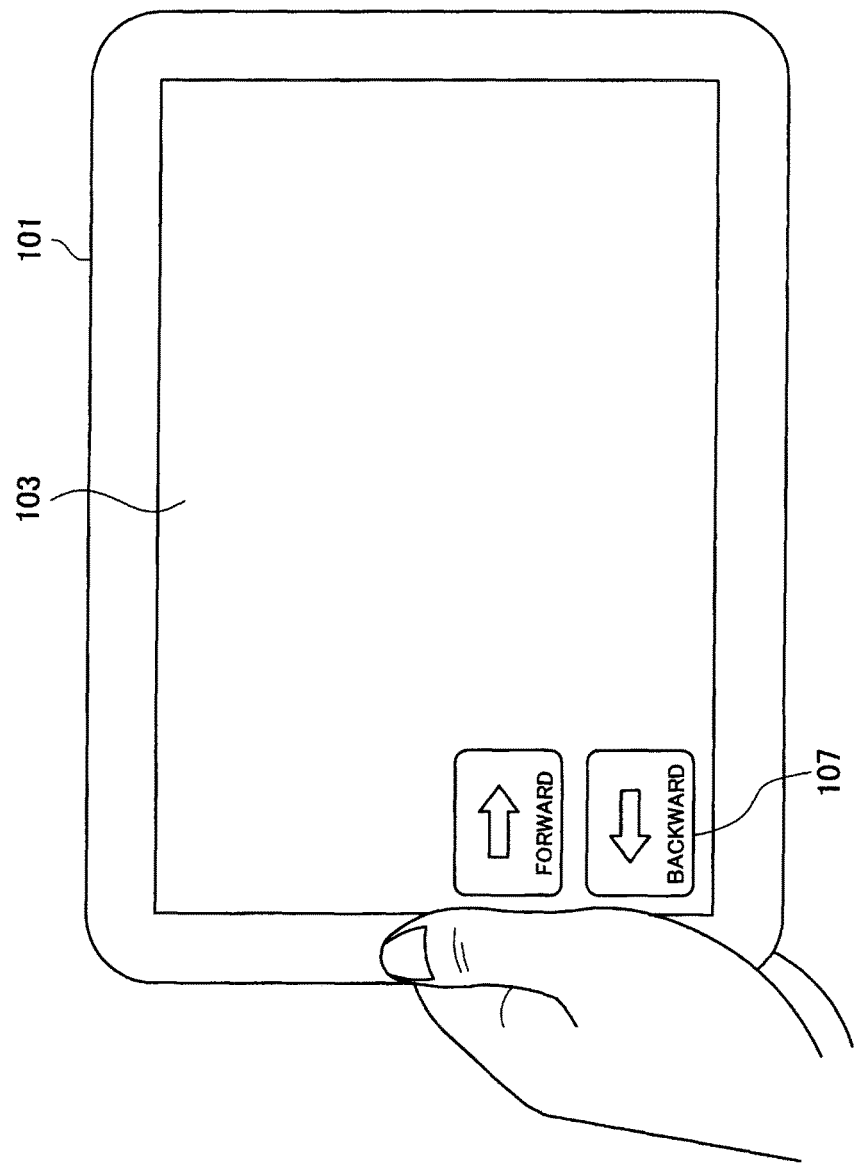

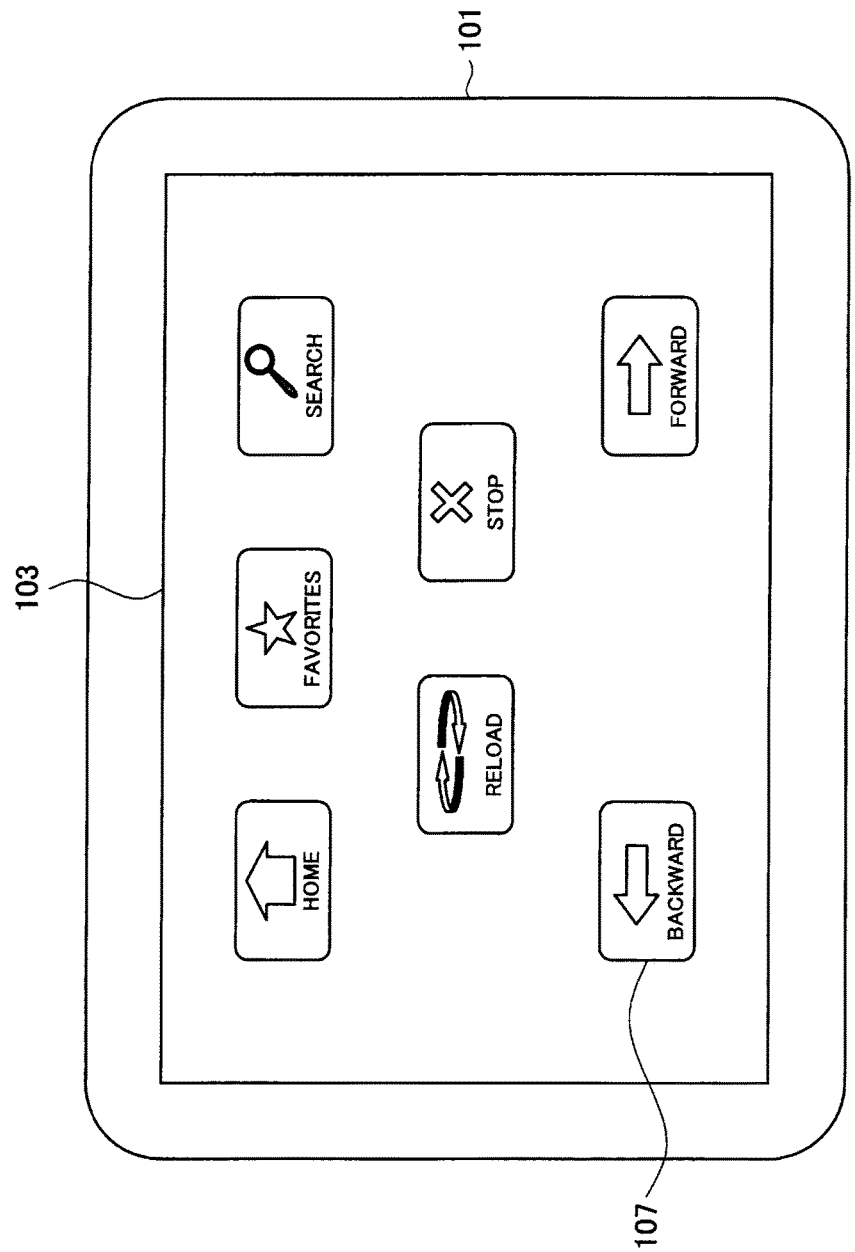

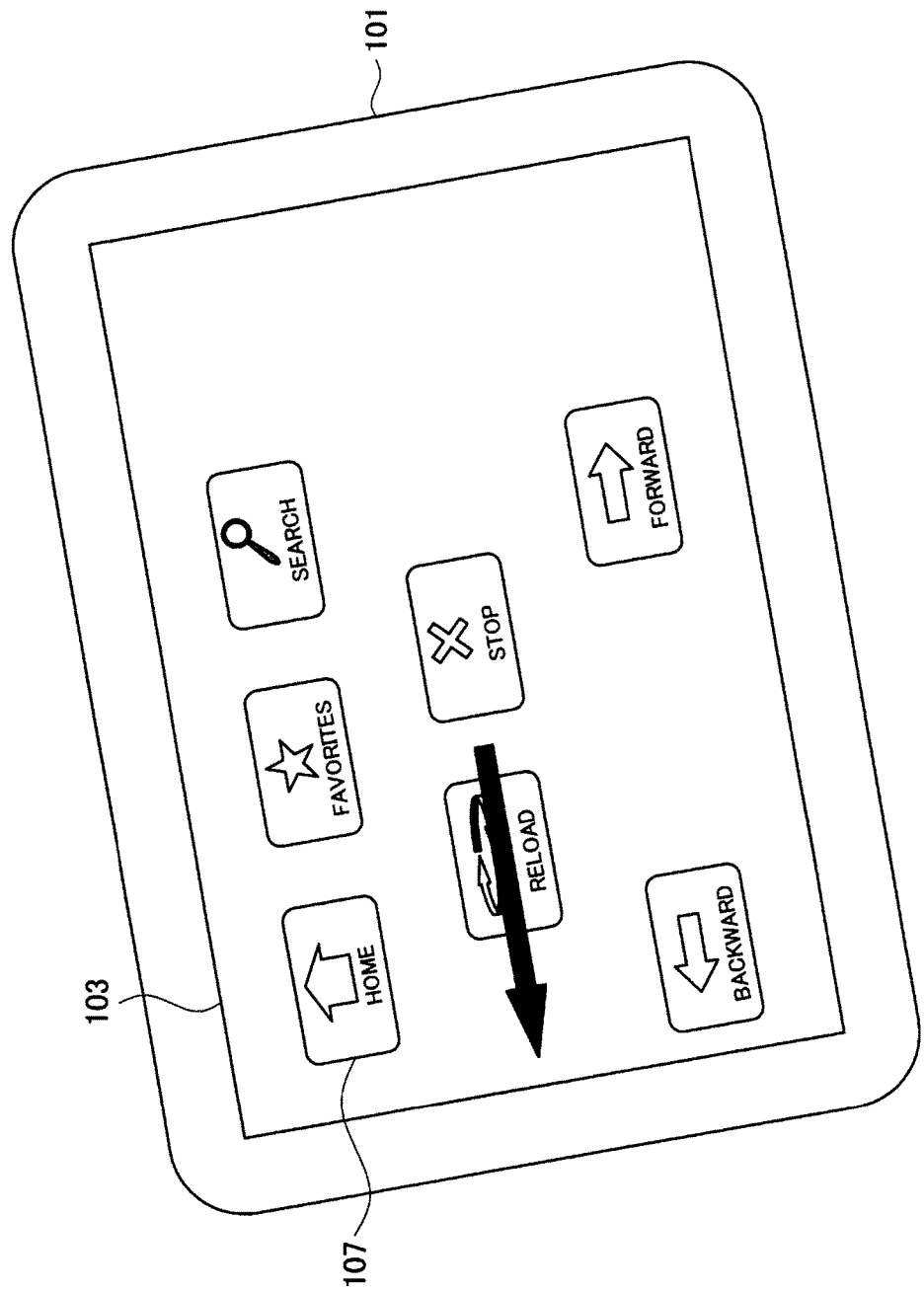

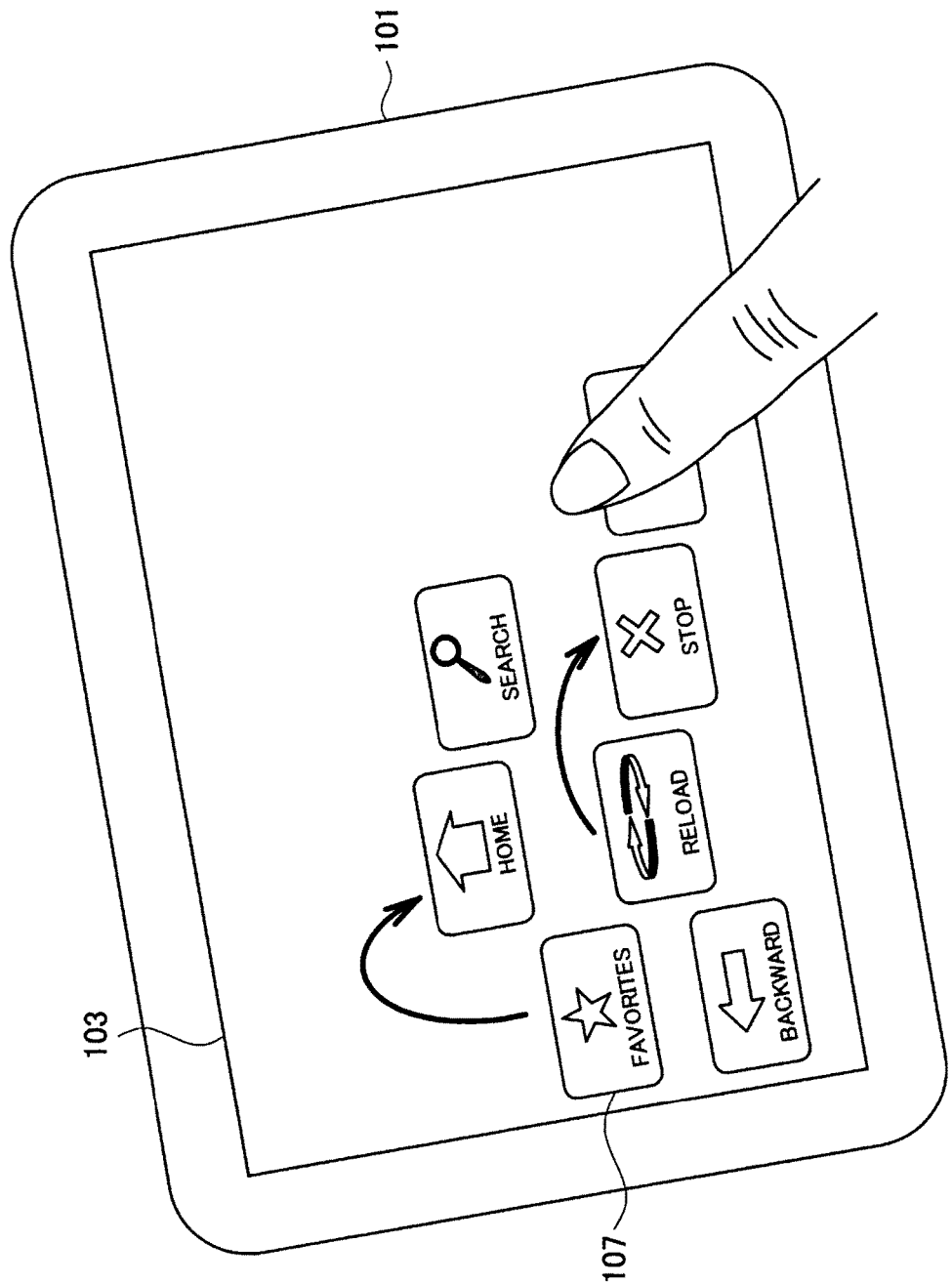

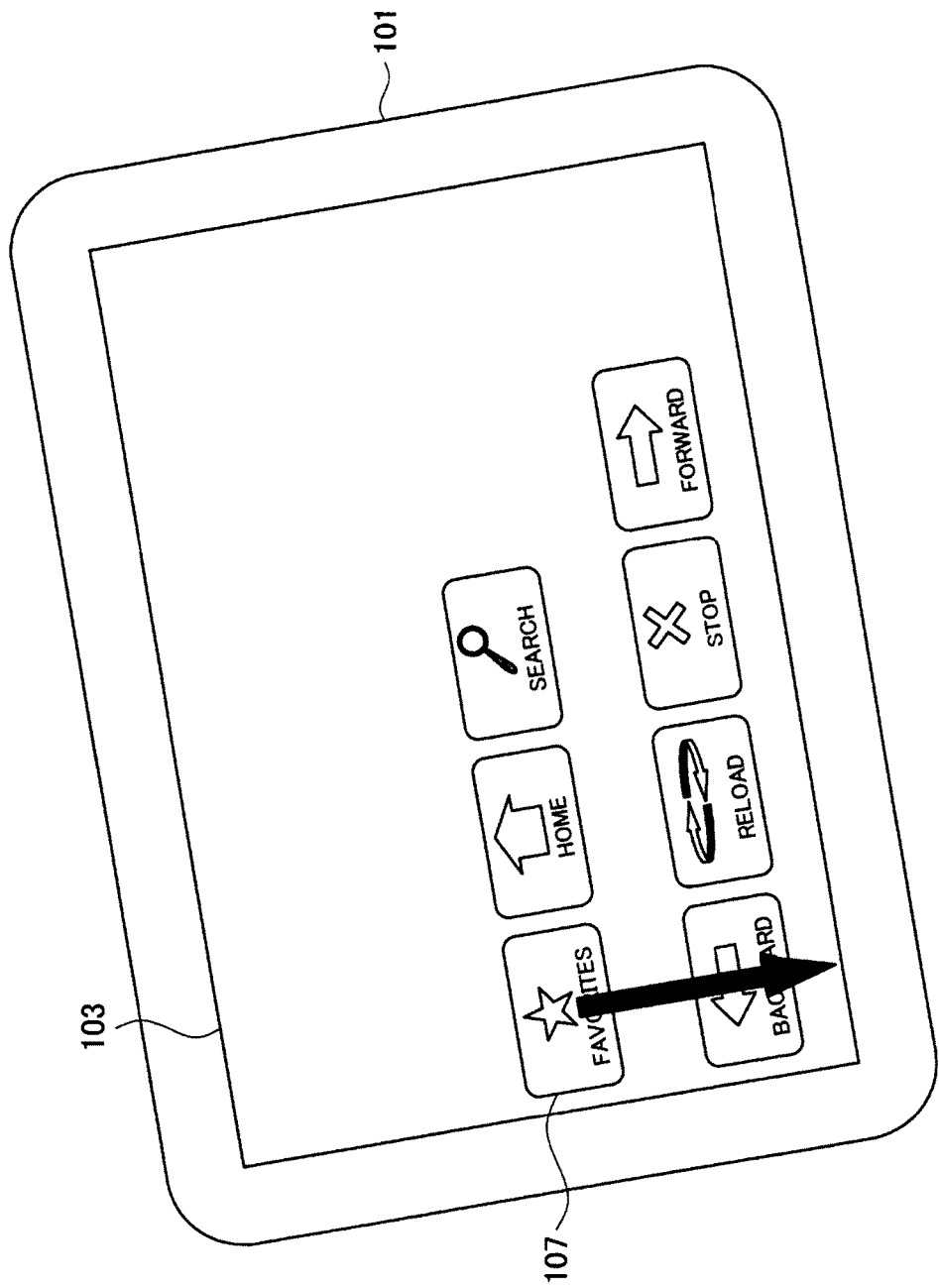

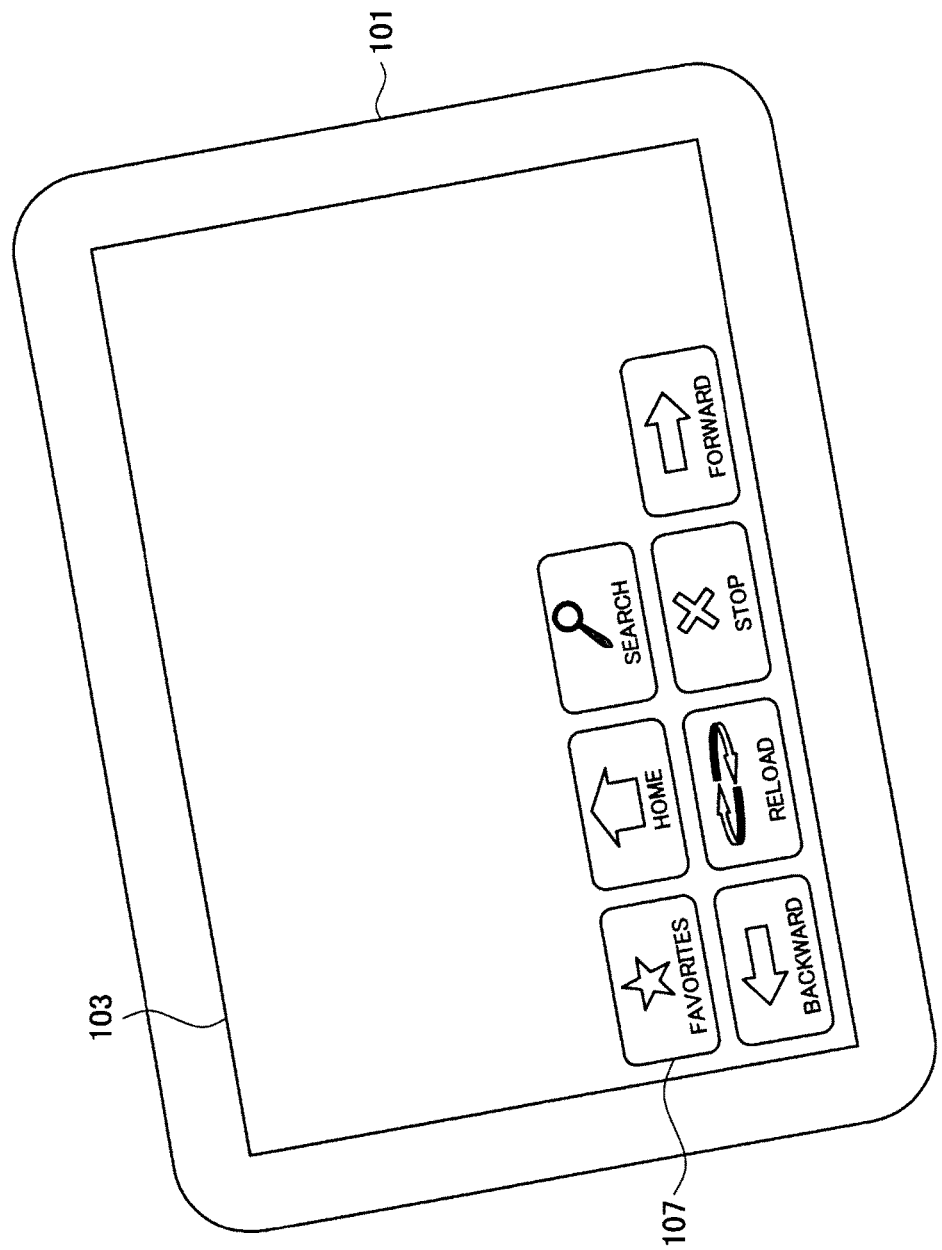

INFORMATION PROCESSING DEVICE AND PROGRAM

CROSS-REFERENCE TO RELATED APPLICATIONS

This application is a continuation of U.S. application Ser. No. 12/966,572, filed Dec. 13, 2010, which claims the benefit of priority from Japanese Patent Application No. 2010-003086, filed Jan. 8, 2010, the contents of which is incorporated in its entirety.

BACKGROUND OF THE INVENTION

Field of the Invention

The present invention relates to an information processing device and a program.

Description of the Related Art

Devices using a touch panel are being spread as a method of improving operability in a portable information processing device. For example, the touch panel also functions as an input device by displaying an icon, such as a button, as a user interface on a display screen like a liquid crystal panel and detecting a contact of a user with the icon. Using the touch panel, wide display screen and the free button arrangement corresponding to various functions may be implemented.

As another method of improving the operability in the portable information processing device, a physical state change of the device is detected and used in an input. For example, Japanese Patent Application Laid-Open No. 2001-170358 discloses a technique of detecting a tilt amount, momentum, an impact amount, or the like in a game system and changing a game space state on the basis of the detected amount.

SUMMARY OF THE INVENTION

However, the size of a portable information processing device using a touch panel has recently been various. For example, in the case of a relatively large-sized device whose housing can be held in one hand like a board-type compact personal computer (PC), there is a problem in that it is difficult for a user to manipulate a button of an opposite side to the side of the held housing on a display screen with one hand holding the housing.

In light of the foregoing, it is desirable to provide a novel and improved information processing device capable of displaying an optimal user interface on a touch panel in response to a direction in which a user holds a housing.

According to an embodiment of the present invention, there is provided an information processing device including a housing, a display screen, a touch panel arranged on the display screen, an icon, which is displayed on the display screen and manipulated through the touch panel, a state detection unit for detecting a state change of the housing, a state determination unit for determining the state change of the housing detected by the state detection unit, and a display control unit for displaying the icon in a desired position on the display screen in response to a determination result of the state determination unit.

By this configuration, it is possible to automatically display an optimal user interface on a touch panel in response to a state in which a user uses the information processing device.

The determination result may be a direction in which a user holds the housing. The display control unit may display the icon within an area along a side of the holding direction of the display screen.

The state detection unit may be used to detect contact of a user with a predetermined portion of the housing as the state change.

The state detection unit can be an electrostatic sensor or a proximity sensor.

The state detection unit may be used to detect an impact applied to the housing by a user as the state change.

The state detection unit may be used to detect a change of a tilt applied to the housing by a user as the state change.

The state detection unit can be an acceleration sensor.

The display control unit may display the icon in the desired position by moving the manipulating image on the display screen in response to the state change.

The display control unit may display the icon in the desired position by further moving the icon on the display screen in response to manipulation through the touch panel.

The display control unit may display the icon in the desired position by causing the manipulating image to appear or be hidden on the display screen in response to the state change.

When the state change is not detected for a predetermined time, the display control unit may cause the icon to be hidden.

According to another embodiment of the present invention, there is provided a program for causing a computer of an information processing device, including a housing, a display screen, a touch panel arranged on the display screen, an icon, which is displayed on the display screen and manipulated through the touch panel, and a state detection unit for detecting a state change of the housing, to execute the processes of determining the state change of the housing detected by the state detection unit; and displaying the icon in a desired position on the display screen in response to a determination result of the determining process.

According to the embodiments of the present invention described above, it is possible to display an optimal user interface on a touch panel in response to a direction in which a user holds a housing in an information processing device.

BRIEF DESCRIPTION OF THE DRAWINGS

FIG. 4A is a diagram showing an example of a state during processing according to the same embodiment.

FIG. 4B is a diagram showing an example of a state during processing according to the same embodiment.

FIG. 4C is a diagram showing an example of a state during processing according to the same embodiment.

FIG. 5A is a diagram showing an example of a state during processing according to a second embodiment of the present invention.

FIG. 5B is a diagram showing an example of a state during processing according to the same embodiment.

FIG. 6 is a flowchart showing the outline of processing according to a third embodiment of the present invention.

FIG. 7A is a diagram showing an example of a state during processing according to the same embodiment.

FIG. 7B is a diagram showing an example of a state during processing according to the same embodiment.

FIG. 7C is a diagram showing an example of a state during processing according to the same embodiment.

FIG. 10A is a diagram showing an example of a state during processing according to the same embodiment.

FIG. 10B is a diagram showing an example of a state during processing according to the same embodiment.

FIG. 10C is a diagram showing an example of a state during processing according to the same embodiment.

FIG. 10D is a diagram showing an example of a state during processing according to the same embodiment.

FIG. 10E is a diagram showing an example of a state during processing according to the same embodiment.

DETAILED DESCRIPTION OF THE EMBODIMENT(S)

Figure 1:
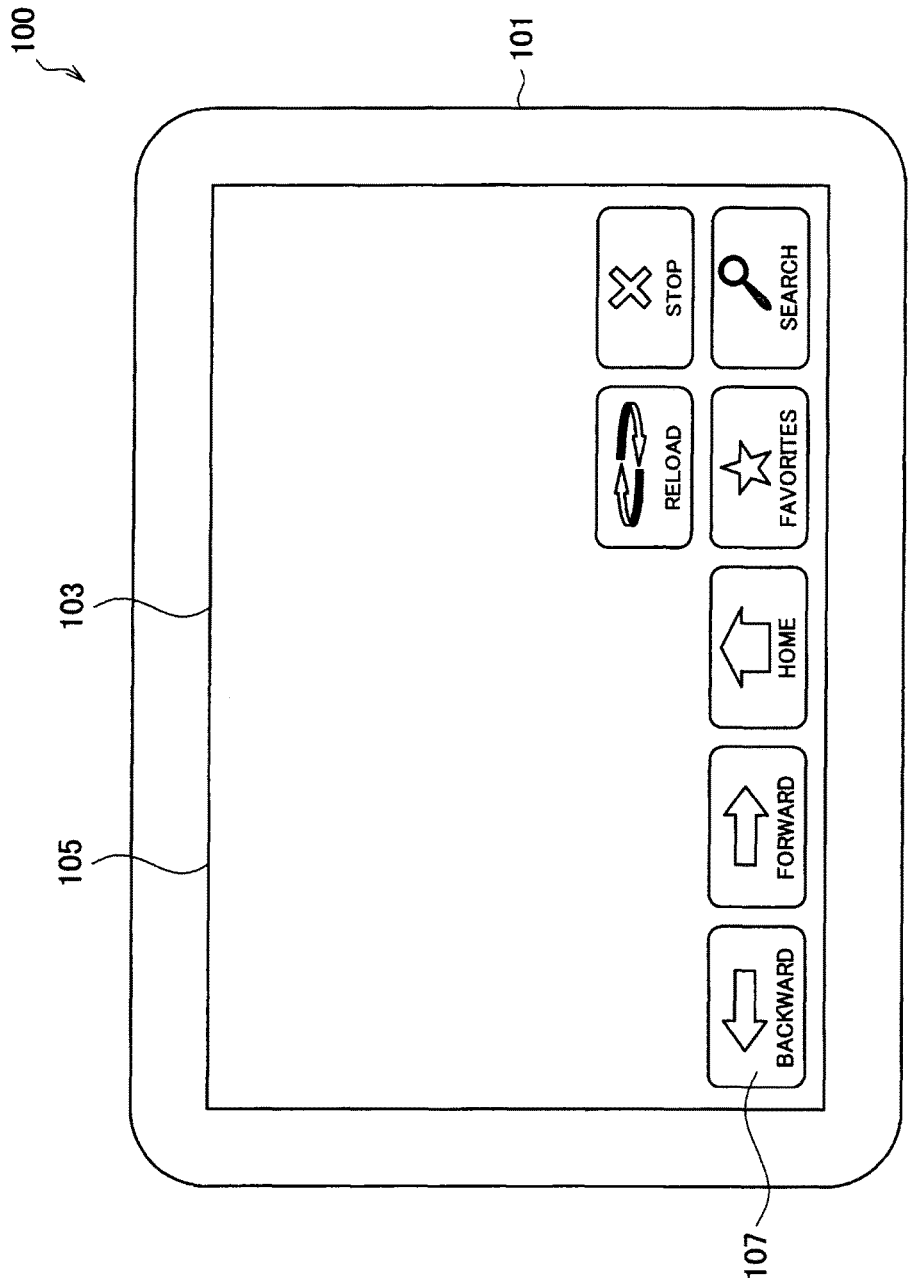
FIG. 1 is a diagram illustrating an external appearance of an information processing device according to embodiments of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Description is given in the following order.
1. Outline of a device according to embodiments of the present invention
2. Details of embodiments of the present invention
   2-1. First embodiment (an example of an information processing device, which detects contact)
   2-2. Second embodiment (an example of an information processing device, which detects an impact)
   2-3. Third embodiment (an example of an information processing device, which detects a tilt)
   2-4. Fourth embodiment (a modified example of an information processing device, which detects a tilt)
3. Supplement

1. Outline of a Device According to Embodiments of the Present Invention

As shown in FIG. 1, for example, an information processing device 100 according to the embodiments is a board-type compact PC, an electronic book reader, a personal digital assistant (PDA), a smart phone, or the like. In general, the information processing device 100 is held and manipulated by one hand, and has, for example, various functions such as a Web browser, content reproduction, and the like.

The information processing device 100 has a liquid crystal display (LCD) 103 as a display screen on a housing 101. A touch panel 105 is arranged on the LCD 103 and buttons 107 are displayed as icons, which are manipulated through the touch panel 105. For example, if the information processing device 100 functions as the Web browser, the buttons 107 are buttons of Backward, Forward, Reload, and the like. The icons may also be a scroll bar, a scroll area, or the like.

Figure 2:
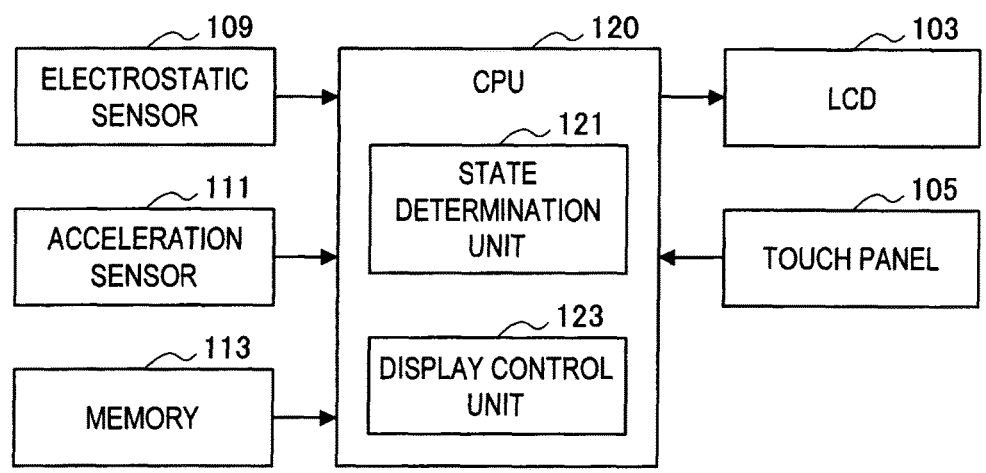
FIG. 2 is a block diagram of the information processing device according to embodiments of the present invention.

As shown in FIG. 2, for example, the information processing device 100 includes electrostatic sensors 109, an acceleration sensor 111, a memory 113, and a central processing unit (CPU) 120 as components having functions according to the embodiments. Any one of the electrostatic sensors 109 and the acceleration sensor 111 may be provided.

Additionally, the information processing device 100 appropriately includes a communication device connected to a network, a device that performs reading and writing on a removable storage medium, an audio output device, and the like.

The CPU 120 implements functions of a state determination unit 121 and a display control unit 123 by executing a program stored in the memory 113. At this time, the CPU 120 executes various types of processing on the basis of information or signals input from the electrostatic sensors 109, the acceleration sensor 111, or the touch panel 105 if necessary. The CPU 120 outputs a processing result to the LCD 103 if necessary.

The electrostatic sensors 109 are arranged on the surface of the housing 101 as a state detection unit, which reacts to contact of a user. In this case, a plurality of electrostatic sensors 109 may be arranged to detect contact in different directions. The CPU 120 receives an input of the presence/absence of the reaction of the electrostatic sensor 109.

The acceleration sensor 111 is provided within the housing 101 as a state detection unit, which measures the acceleration of the housing 101. The CPU 120 receives the direction and magnitude of the acceleration measured by the acceleration sensor 111 as inputs, and detects a tilt of the housing 101 and an impact applied to the housing 101.

The memory 113 is a storage device such as a read only memory (ROM), a random access memory (RAM), or the like. A program, which is stored in the memory 113 and executed by the CPU 120, may be written upon manufacture of the information processing device 100 or may be acquired through the above-described communication device or removable storage medium and temporarily stored.

2. Details of Embodiments of the Present Invention

2-1. First Embodiment (an Example of an Information Processing Device, which Detects Contact)

Figure 3:
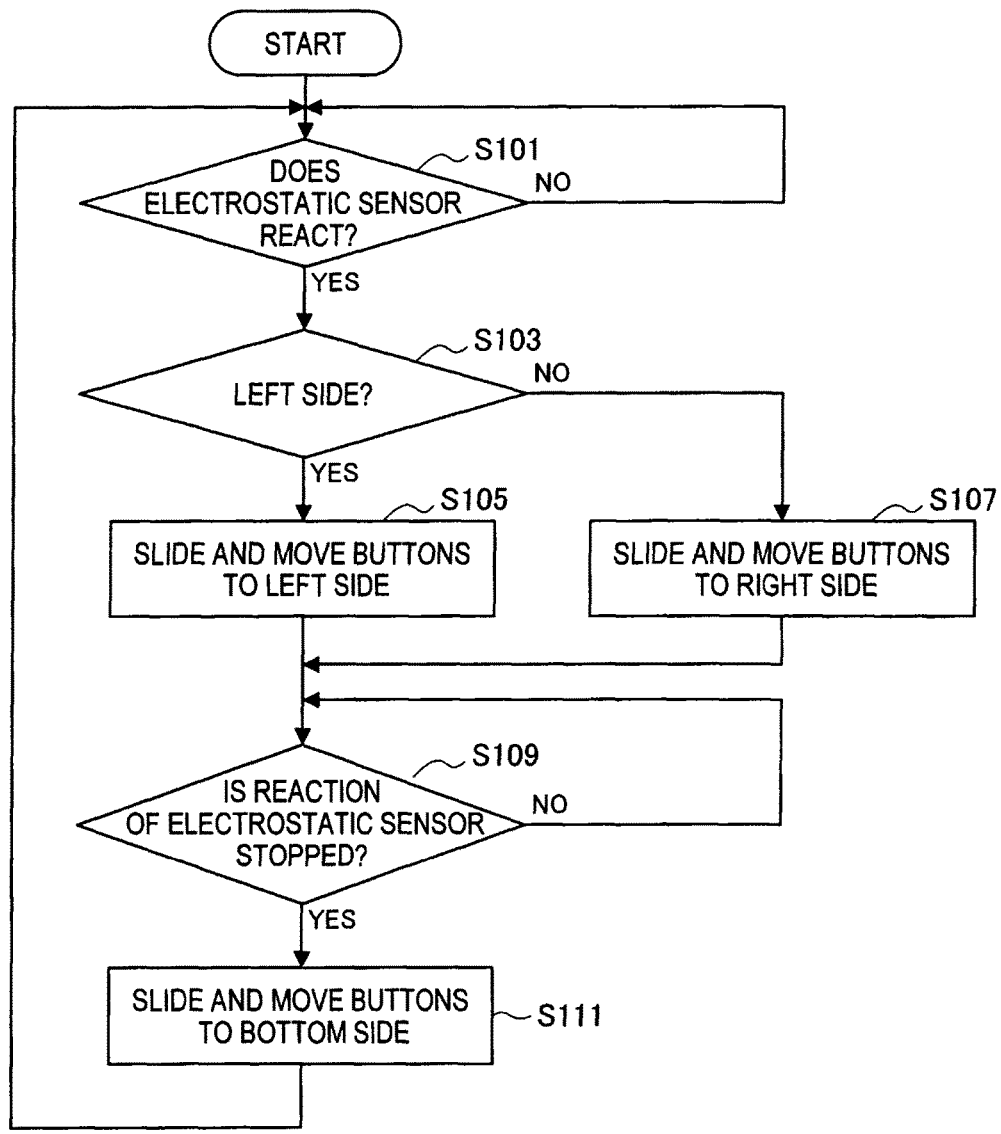
FIG. 3 is a flowchart showing the outline of processing according to a first embodiment of the present invention.

FIG. 3 is a flowchart showing the outline of processing to be performed by the information processing device 100 according to the first embodiment of the present invention. Hereinafter, the first embodiment of the present invention will be described with reference to FIG. 3 and FIGS. 4A to 4C showing states of the information processing device 100 in processes.

In this embodiment, the information processing device 100 includes the electrostatic sensors 109 provided on the surface of the housing 101. The electrostatic sensors 109 are arranged on both left and right sides. It is preferable that the electrostatic sensors 109 be provided on arbitrary portions, which are assumed to have contact when the user performs holding, depending on a function of the information processing device 100.

FIG. 4A illustrates a state in which the housing 101 is held by the left hand of the user. At this time, the electrostatic sensor 109 provided on the left side of the housing reacts.

In this case, the state determination unit 121 first determines whether or not there is the reaction of the electrostatic sensor 109 (step S101). Next, the state determination unit 121 determines whether or not the reacted electrostatic sensor 109 is on the left side (step S103).

If the reacted electrostatic sensor 109 is on the left side, the display control unit 123 moves the buttons 107 to the left side on the LCD 103, and displays the buttons 107 in a desired position, that is, within an area along the left side (step S105). The buttons 107 may move with a sliding visual effect or may instantly move. In the case where the buttons 107 is not displayed at this time, the buttons 107 may appear in the desired position.

As a result, the buttons 107 are displayed in a range in which manipulation can be performed by a finger of the left hand in a state in which the user holds the housing 101 by the left hand, so that the user can manipulate the buttons 107 without feeling the stress that the finger does not reach the button.

FIG. 4B illustrates a state in which the housing 101 is held by the right hand of the user. In this case, since there is the reaction of the electrostatic sensor 109 (step S101) and the reacted electrostatic sensor 109 is not on the left side (step S103), the display control unit 123 moves the buttons 107 to the right side on the LCD 103 (step S107). A movement method or a display position as a movement result is the same as that when movement to the left side is made.

FIG. 4C illustrates a state in which the housing 101 is not held by the user. At this time, the electrostatic sensors 109 of both the left and right end surfaces do not react. The state determination unit 121 determines whether or not the reaction of the electrostatic sensor 109 is stopped (step S109). If the reaction of the electrostatic sensor 109 is stopped, the display control unit 123 moves the buttons 107 to the bottom side of the LCD 130 (step S111).

In a state in which the housing 101 is not held by the user, it is not necessary to move the button 107 in the same way as in the above-described example. A position in the holding state of the user just before the housing 101 is not held by the user may remain. For example, if wallpaper display or the like is made on the screen, the wallpaper display may temporarily be hidden not to cause an obstruction.

2-2. Second Embodiment (an Example of an Information Processing Device, which Detects an Impact)

FIGS. 5A and 5B are diagrams showing states in processes of the information processing device 100 according to the second embodiment of the present invention. Hereinafter, the second embodiment of the present invention will be described with reference to FIGS. 5A and 5B.

In this embodiment, the information processing device 100 includes the acceleration sensor 111 inside the housing 101. From a change in acceleration measured by the acceleration sensor 111, the state determination unit 121 determines whether or not the impact is applied to the housing 101 by the user, and determines whether the impact is that from the left or right side if the impact is applied.

FIG. 5A illustrates a state in which the impact from the left side of the housing 101 is applied by the user. In this case, as shown in FIG. 5B, the display control unit 123 moves the buttons 107 into an area along a desired position, that is, the left side, on the LCD 103, and displays the moved buttons 107. The buttons 107 may move with a sliding visual effect or may instantly move. In the case where the buttons 107 is not displayed at this time, the buttons 107 may appear in the desired position.

If the impact from the right side of the housing 101 is applied by the user, the display control unit 123 moves the buttons 107 to the right side on the LCD 103 as in the case where the impact from the left side is applied.

2-3. Third Embodiment (an Example of an Information Processing Device, which Detects a Tilt)

Figure 8A:
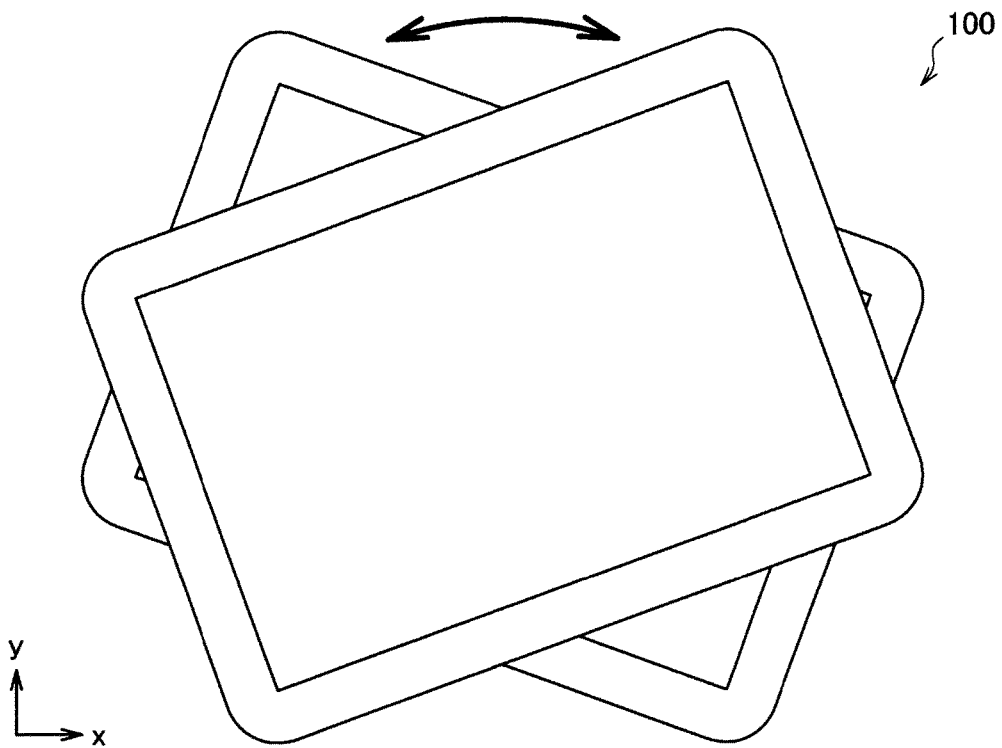
FIG. 8A is an illustrative diagram for a tilt handled in the same embodiment.
Figure 8B:
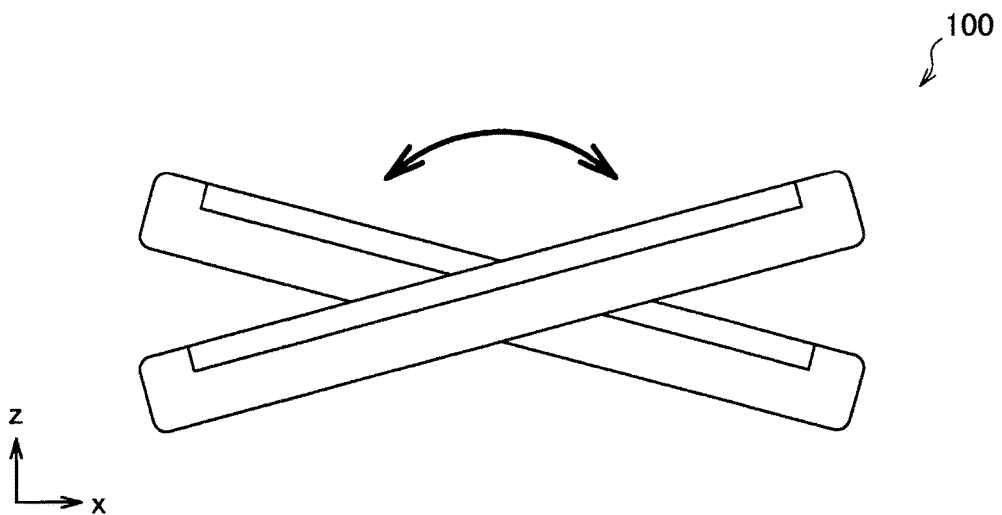
FIG. 8B is an illustrative diagram for a tilt handled in the same embodiment.

FIG. 6 is a flowchart showing the outline of processing to be performed by the information processing device 100 according to the third embodiment of the present invention. Hereinafter, the third embodiment of the present invention will be described with reference to FIG. 6, FIGS. 7A to 7C showing states of the information processing device 100 in processes, and FIGS. 8A and 8B showing a tilt direction.

In this embodiment, the information processing device 100 includes the acceleration sensor 111 inside the housing 101. From a change in acceleration measured by the acceleration sensor 111, the state determination unit 121 determines whether the user tilts the housing 101 to its extent, and determines a direction of the tilt if the housing 101 is tilted.

FIG. 7A illustrates a state in which the housing 101 is substantially horizontally held by the user. If the magnitude of a tilt of the housing 101 is less than a predetermined angle θ, the display control unit 123 does not start processing (step S201) and does not move the buttons 107.

FIG. 7B illustrates a state in which the housing 101 is tilted by the user and the magnitude of the tilt becomes equal to or greater than the predetermined angle θ.

In this case, the state determination unit 121 first determines whether or not the magnitude of the tilt of the housing 101 becomes equal to or greater than the predetermined angle θ (step S201). Next, it is determined whether or not the direction of the tilt is left (step S203).

If the tilt of the housing 101 is left, the display control unit 123 moves the buttons 107 to the left side on the LCD 103, and displays the buttons 107 in a desired position, that is, within an area along the left side (step S205). The buttons 107 may move with a sliding visual effect or may instantly move. In the case where the buttons 107 is not displayed at this time, the buttons 107 may appear in the desired position.

If the tilt of the housing 101 is right in the determination of the tilt direction (step S203), the buttons 107 move to the right side (step S207). A movement method or a display position as a movement result is the same as that when the movement to the left side is made.

Once the user tilts the housing 101 to a reverse side to the movement direction at a predetermined angle or more after the buttons 107 move to the left or right side (step S209), the display control unit 123 moves the buttons 107 to the reverse side (step S211).

By providing these steps, for example, even when the housing 101 is instantly tilted to a reverse side to a holding side intended by the user in a process in which the user holds the housing 101 by the hand, the buttons 107 can be displayed in the original desired position if the housing 101 is tilted to the holding side thereafter.

FIG. 7C illustrates a state in which the housing 101 returns to a substantially horizontal posture by the user. In this case, the buttons 107 stay within an area along the left side of the LCD 103. Thus, the user can manipulate the information processing device 100 by horizontally returning and holding the housing 101 after the buttons 107 move once.

The determination of an impact is made in a state in which the above-described movement of the buttons 107 is terminated. If the user applies the impact to the housing 101 (step S213), the buttons may be hidden (step S217). Additionally, if a predetermined time has elapsed after the housing 101 returns to the horizontal posture (step S215), the buttons may be hidden (step S217).

By providing these steps, for example, if the user views a Web page or reproduces video content on the LCD 103, it is possible to maximize an area where the Web page or the video content is displayed by hiding the buttons 107 that do not need to be manipulated.

In this embodiment, the state determination unit 121 determines whether or not there is a tilt corresponding to rotation in a plane (an x-y plane) parallel to a display surface of the housing 101 as shown in FIG. 8A, but this may be a tilt corresponding to rotation in a plane orthogonal to the display surface of the housing 101 (serving as an x-z plane or a y-z plane to the above-described x-y plane), for example, as shown in FIG. 8B, depending on an assumed holding direction of the housing 101.

2-4. Fourth Embodiment (a Modified Example of an Information Processing Device, which Detects a Tilt)

Figure 9:
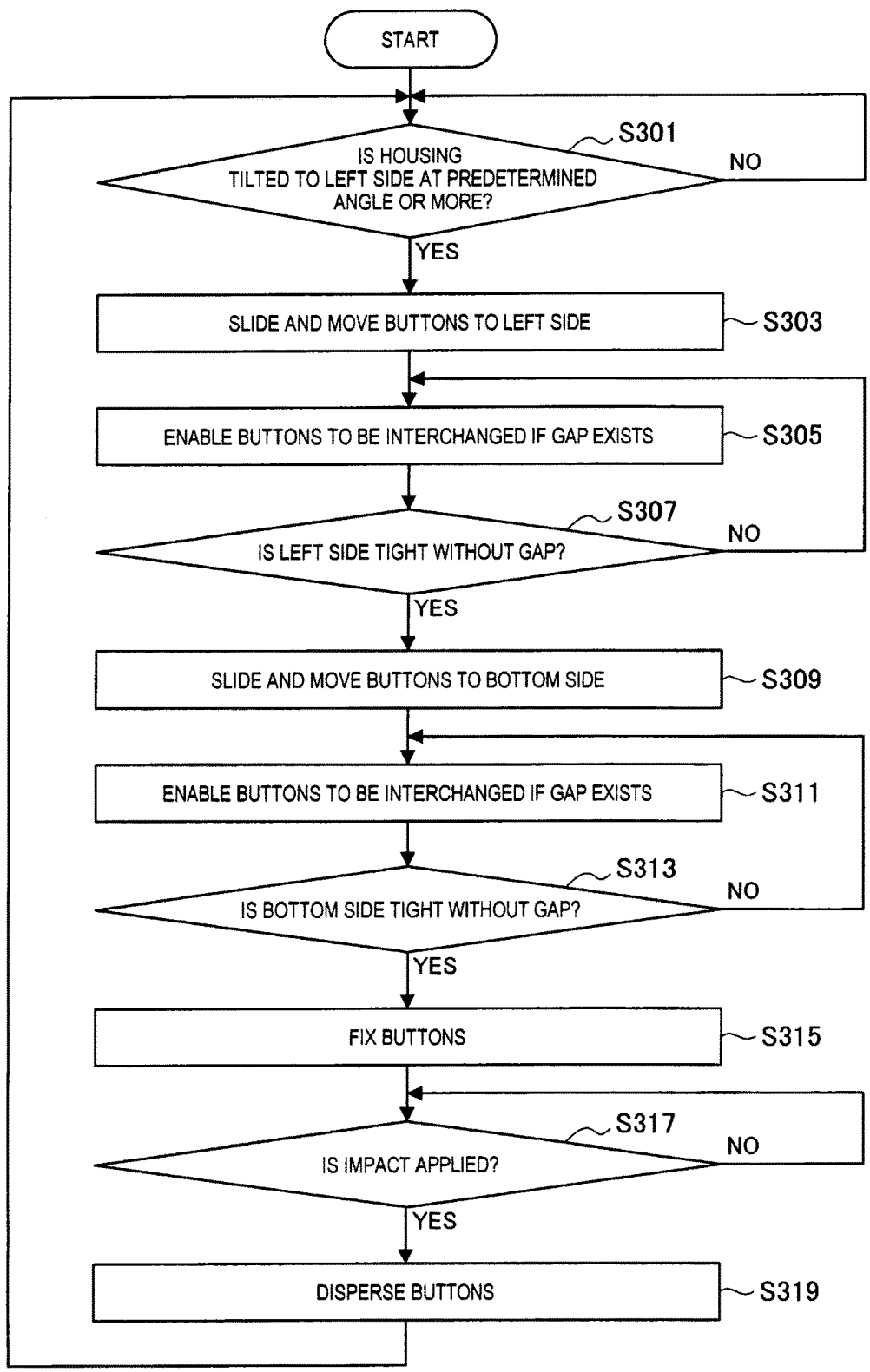
FIG. 9 is a flowchart showing the outline of processing according to a fourth embodiment of the present invention.

FIG. 9 is a flowchart showing the outline of processing to be performed by the information processing device 100 according to the fourth embodiment of the present invention. Hereinafter, the fourth embodiment of the present invention will be described with reference to FIG. 9 and FIGS. 10A to 10F showing states of the information processing device 100 in processes.

In this embodiment, the information processing device 100 includes the acceleration sensor 111 inside the housing 101. The state determination unit 121 determines whether the user applies an impact to the housing 101 in addition to the determination of the tilt of the housing 101 as in the above-described third embodiment. However, it is not necessary to determine whether the impact is on the left or right side differently from the second embodiment.

The flowchart of FIG. 9 is described as an example in which a tilt direction of the housing 101 is left, but the same is true even when the tilt direction of the housing 101 is right.

FIG. 10A illustrates a state in which the user substantially horizontally holds the housing 101. The buttons 107 are dispersed and arranged in a predetermined position on the LCD 103 as an initial display state. If the magnitude of the tilt of the housing 101 is less than a predetermined angle, the display control unit 123 does not move the buttons 107 without starting processing (step S301).

FIG. 10B illustrates a state in which the user tilts the housing 101 and the magnitude of the tilt becomes equal to or greater than a predetermined angle. In this case, the state determination unit 121 determines whether the housing 101 is tilted to the left side at the predetermined angle or more (step S301). If the housing 101 is tilted to the left side at the predetermined angle or more, the display control unit 123 displays the buttons 107 by moving the buttons 107 to the left side on the LCD 103 (step S303).

Here, the buttons 107 move with a sliding visual effect. Since the buttons 107 move from a state in which the buttons 107 are dispersed and arranged as shown in FIG. 10A, a gap exists between the buttons 107 being displayed for a certain time after the movement is started. At this time, the user can further change positions of the buttons 107 by manipulating the touch panel 105.

FIG. 10C illustrates a state in which the user further changes the positions of the buttons 107 by manipulating the touch panel 105. If manipulation in which the user drags a button 107 displayed on the LCD 103 by a finger is input from the touch panel 105, the display control unit 123 gives displacement corresponding to the drag manipulation to the button 107 serving as an object of the manipulation by the user, and displays the button 107 on the LCD 103 (step S305).

Thus, the buttons 107 can also be moved by the manipulation of the user in addition to the automatic movement by the tilt of the housing 101, so that the user can not only arrange the buttons 107 in a range where the user can simply perform manipulation by a holding finger, but can also designate an arrangement order of the buttons 107 to a desired arrangement of the user. Furthermore, it is possible to implement a button arrangement in which the user can easily perform manipulation.

FIG. 10D illustrates a state in which the buttons 107 are displayed using a left side of the LCD 103 as a left end in a state in which there is no gap on the left and right as a result in which the buttons 107 move to the left side. In a state in which there is no gap on the left and right of the buttons 107 in the display of the LCD 103 (step S307), the display control unit 123 displays the buttons 107 by moving the buttons 107 to the bottom side (step S309).

Here, the buttons 107 move with a sliding visual effect. Even in a state as shown in FIG. 10D, there is a gap above and below the buttons 107. At this time, the user can further change the positions of the buttons 107 by manipulating the touch panel 105 like when the buttons 107 move to the left side (step S311).

FIG. 10E illustrates a state in which the buttons 107 are arranged using a bottom side of the LCD 103 as a bottom end in a state in which there is no gap above and below as a result in which the buttons 107 move to the bottom side. If a state in which there is no gap above and below the buttons 107 is reached in the display of the LCD 103 (step S313), the display control unit 123 fixes positions of the buttons 107 on the LCD 103 (step S315).

Once the movement of the buttons 107 is terminated by the above-described processing, the user can manipulate the information processing device 100 by the buttons 107 arranged in a desired position.

However, when the user changes a position of the buttons 107 by the touch panel 105 in the above-described processing, the position of the arranged buttons 107 may be different from a desired position.

Figure 10F:
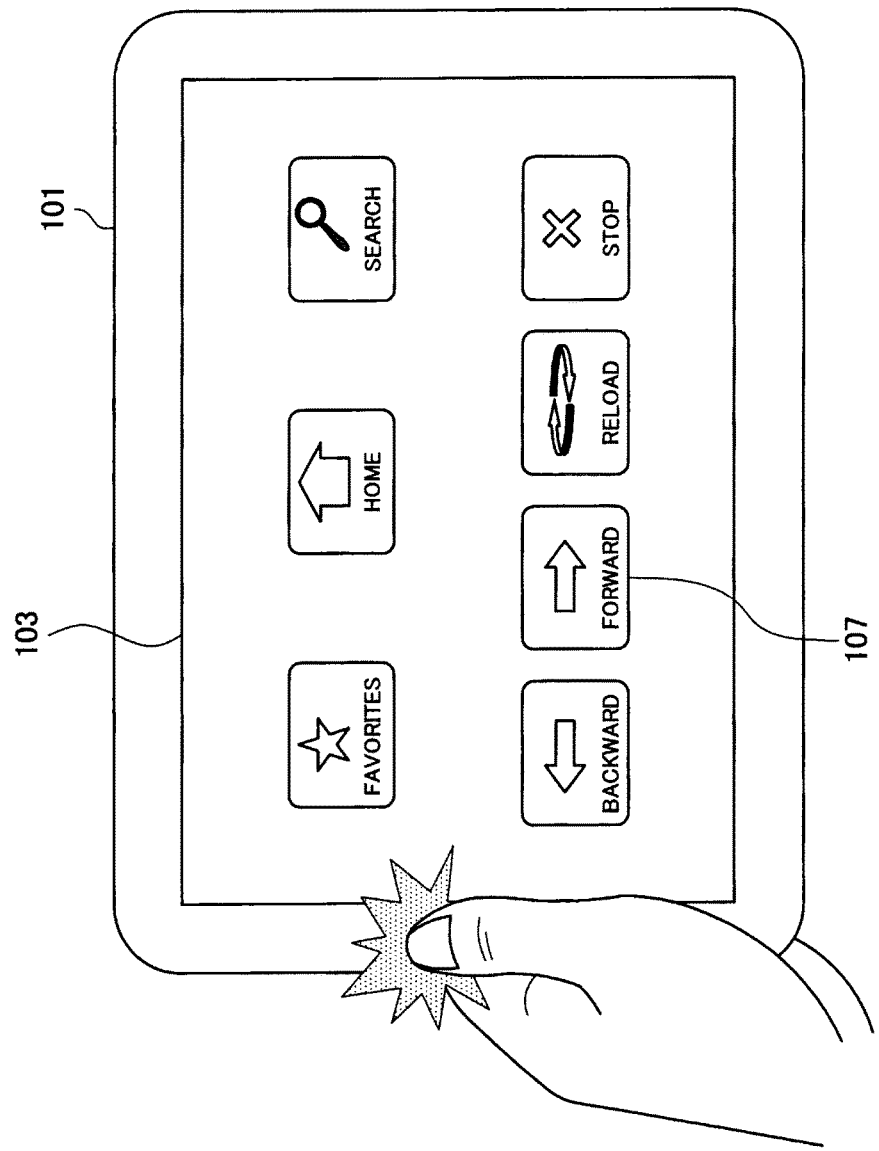
FIG. 10F is a diagram showing an example of a state during processing according to the same embodiment.

FIG. 10F illustrates a state in which the user applies an impact to the housing 101 in the case as described above. The state determination unit 121 determines whether or not there is the impact from a change in acceleration measured by the acceleration sensor 111 (step S317). If there is the impact, the display control unit 123 displays the buttons 107 in a state in which the buttons 107 are dispersed and arranged again (step S319).

From this, the user can re-perform an arrangement any number of times until the user completes a desired arrangement of the buttons 107 by re-performing the manipulation of tilting the housing 101 (step S301).

3. Supplement

It should be understood by those skilled in the art that various modifications, combinations, sub-combinations and alterations may occur depending on design requirements and other factors insofar as they are within the scope of the appended claims or the equivalents thereof.

For example, the information processing devices that detect contact, an impact, and a tilt have been described by separate embodiments in the above-described embodiments, but the present invention is not limited to this example. For example, the contact may be detected, combined, and used along with the impact, the impact and the tilt, or the tilt and the contact, or the contact may be detected, combined, and used along with the impact and the tilt. They may be switched and used by settings of software.

The electrostatic sensor detects the contact of the user in the above-described embodiment, but the present invention is not limited to this example. For example, detection may be performed by a sensor other than the electrostatic sensor or detection may be performed by a side of the touch panel.

The acceleration sensor detects the tilt and the impact of the housing in the above-described embodiment, but the present invention is not limited to this example. For example, the structure of the acceleration sensor may be simplified by detecting the impact by a contact switch.

The information processing devices according to all the embodiments of the present invention have been described in the above-described embodiments, but the present invention is not limited to these examples. For example, a program for executing various types of processing described in the above-described embodiments may be provided to an information processing device having the acceleration sensor or the like through a communication line, a removable storage medium, or the like.

The present invention contains subject matter related to Japanese Patent Application JP 2010-003086 filed in the Japanese Patent Office on Jan. 8, 2010, the entire contents of which being incorporated herein by reference.

What is claimed is:

1. An information processing device, comprising:
a housing;
a display;
a touch panel arranged on the display;
a first sensor configured to detect a tilt of the housing in a plane parallel to the display;
a second sensor configured to detect a state change of the housing according to an impact applied to the housing by a user; and
processing circuitry configured to
determine an orientation of the housing according to the tilt detected by the first sensor;
control the display to display a plurality of icons so that an icon, of the plurality of icons and which is manipulated via the touch panel, is displayed in a desired position on the display in response to the orientation of the housing;
determine whether a gap exists between the icon and the other icon in a direction of the tilt of the housing in the plane parallel to the display, the direction of the tilt of the housing being a longitudinal direction of the housing when the house is tilted in the plane parallel to the display;
in response to determining that the gap exists, enable the user to interchange a position of the icon with a position of another icon of the plurality of icons in the direction of the tilt of the housing in the plane parallel to the display via a dragging manipulation on the touch panel by the user;
determine the state change of the housing according to the impact detected by the second sensor; and
control the display to hide the icon in response to determination of the state change of the housing.

2. The information processing device according to claim 1, wherein the second sensor is configured to detect, as the state change, a contact of the user to a predetermined portion of the housing.

3. The information processing device according to claim 2, wherein the contact of the user to the predetermined portion of the housing is the impact applied to the housing by the user.

4. The information processing device according to claim 2, wherein the predetermined portion is a peripheral portion of the housing.

5. The information processing device according to claim 1, wherein the processing circuitry is configured to control the display to display the icon so as to move with a sliding visual effect on the display in response to the determination of the orientation of the housing.

6. The information processing device according to claim 1, wherein the processing circuitry is configured to control to display the icon so as to instantly move on the display in response to the determination of the orientation of the housing.

7. A non-transitory computer readable medium storing computer executable instructions that, when executed by an information processing device including a housing, a display, a touch panel, a first sensor, a second sensor and processing circuitry, cause the processing circuitry to:
determine an orientation of the housing according to a tilt of the housing in a plane parallel to the display that is detected by the first sensor;
control the display to display a plurality of icons so that an icon, of the plurality of icons and which is manipulated via the touch panel, is displayed in a desired position on the display in response to the determination of the orientation of the housing;
determine whether a gap exists between the icon and the other icon in a direction of the tilt of the housing in the plane parallel to the display, the direction of the tilt of the housing being a longitudinal direction of the housing when the house is tilted in the plane parallel to the display;
in response to determining that the gap exists, enable the user to interchange a position of the icon with a position of another icon of the plurality of icons in the direction of the tilt of the housing in the plane parallel to the display via a dragging manipulation on the touch panel by the user;
determine a state change of the housing according to an impact detected by the second sensor, the impact by a user upon the housing; and
control the display to hide the icon in response to determination of the state change of the housing.

8. The non-transitory computer readable medium according to claim 7, wherein the second sensor is configured to detect, as the state change, a contact of the user to a predetermined portion of the housing.

9. The non-transitory computer readable medium according to claim 8, wherein the contact of the user to the predetermined portion of the housing is the impact applied to the housing by the user.

10. The non-transitory computer readable medium according to claim 8, wherein the predetermined portion is a peripheral portion of the housing.

11. The non-transitory computer readable medium according to claim 7, wherein the processing circuitry is further caused to control the display to display the icon so as to move with a sliding visual effect on the display in response to the determination of the orientation of the housing.

12. The non-transitory computer readable medium according to claim 7, wherein the processing circuitry is further caused to control to display the icon so as to instantly move on the display in response to the determination of the orientation of the housing.

13. An image processing method, comprising:
  detecting, by a first sensor of an information processing device including a display, a tilt of a housing of the information processing device in a plane parallel to the display;
  detecting, by a second sensor of the information processing device, a state change of the housing according to an impact applied to the housing by a user;
  determining an orientation of the housing according to the tilt detected by the first sensor;
  controlling the display to display a plurality of icons so that an icon, of the plurality of icons and which is manipulated via a touch panel, is displayed in a desired position on the display in response to the orientation of the housing;
  determining whether a gap exists between the icon and the other icon in a direction of the tilt of the housing in the plane parallel to the display, the direction of the tilt of the housing being a longitudinal direction of the housing when the house is tilted in the plane parallel to the display;
  in response to determining that the gap exists, enabling the user to interchange a position of the icon with a position of another icon of the plurality of icons in the direction of the tilt of the housing in the plane parallel to the display via a dragging manipulation on the touch panel by the user;
  determining the state change of the housing according to the impact detected by the second sensor; and
  controlling the display to hide the icon in response to determination of the state change of the housing.

14. The information processing device according to claim 1, wherein
  in response to determining that the gap does not exist, the processing circuitry is configured to disable the user to interchange the position of the icon with the position of the another icon of the plurality of icons in the direction of the tilt of the housing in the plane parallel to the display via the dragging manipulation on the touch panel by the user.

* * * * *